April 12, 1938.   G. W. TEMPLE   2,114,272
ADJUSTABLE TRIMMER FOR COLLAPSIBLE TUBE MAKING MACHINES
Filed Dec. 19, 1935
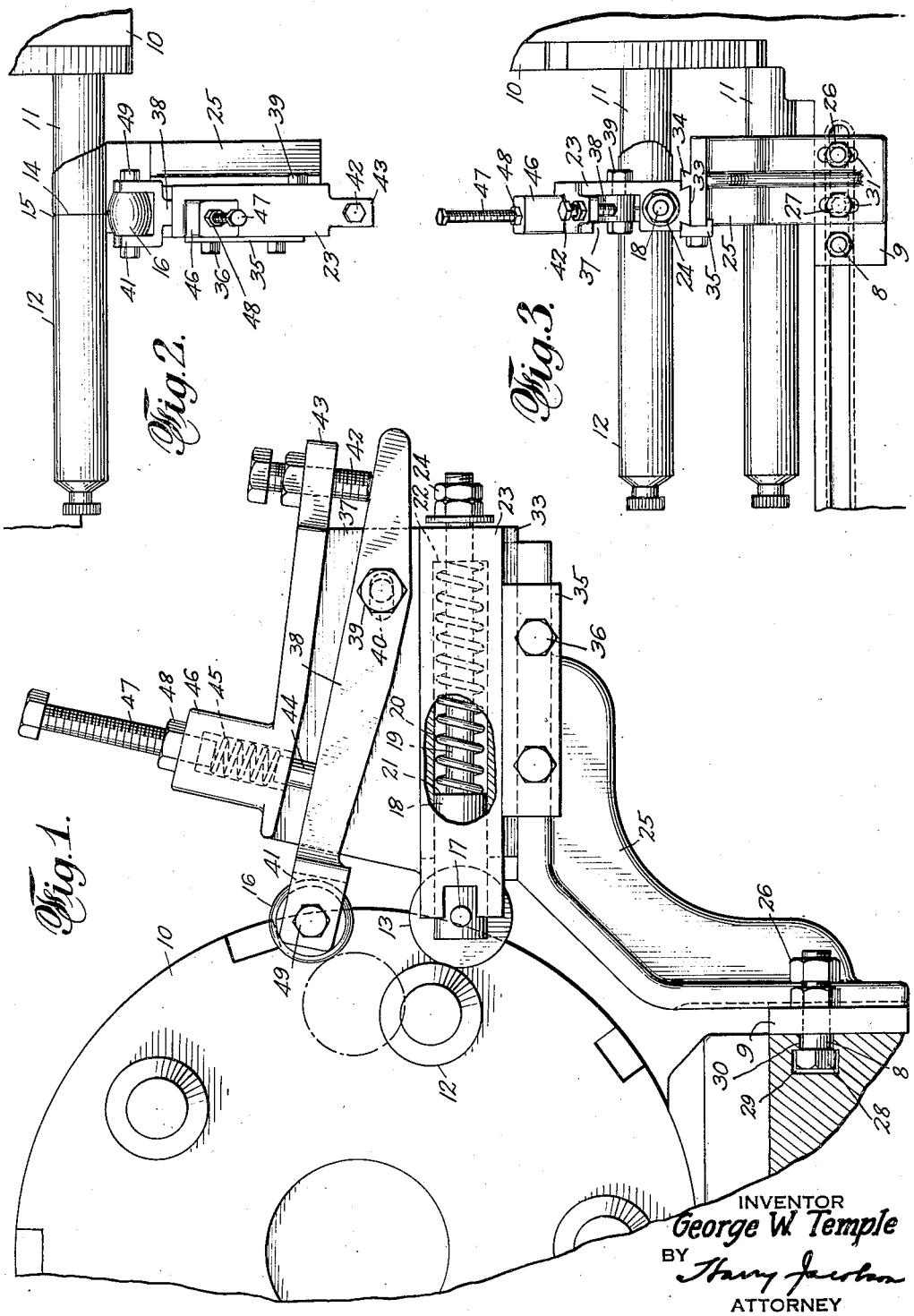
INVENTOR
George W. Temple
BY
ATTORNEY Patented Apr. 12, 1938

2,114,272

UNITED STATES PATENT OFFICE 2,114,272

ADJUSTABLE TRIMMER FOR COLLAPSIBLE TUBE MAKING MACHINES

George W. Temple, New York, N. Y., assignor to Victor Metal Products Corporation, Brooklyn, N. Y., a corporation of New York Application December 19, 1935, Serial No. 55,181

10 Claims. (Cl. 153—2)

This invention relates to machines for operating upon collapsible tubes and particularly, to the trimming means for cutting collapsible tubes to length during the process of the manufacture thereof.

Collapsible tubes, after being extruded on a suitable press, vary considerably in length and also have open ends of irregular shape. Such tubes are therefore mounted on a mandrel in a so-called "trimming machine", in which machine both ends of the tube are trimmed to the required length and frequently, other operations performed on the tube. It has heretofore been necessary to sharpen frequently, the rotary cutter customarily used for trimming the open end of the tube. I have found that the cutter becomes dull owing to the fact that the respective centers of the cutter, of the mandrel upon which the tube is mounted, and of the turret upon which the mandrel is mounted, are not properly aligned in the trimming position so that the mandrel puts undue pressure upon the cutter edge as the mandrel moves the tube into position. This is particularly true when the mandrels of the turret are changed to accommodate tubes of a size different from that to which the cutter has been adjusted.

My invention therefore contemplates the provision of a trimming cutter, and of a flattener for flattening the trimmed open ends of the tube, which cutter is so mounted that it may readily be adjusted to align the center thereof with the respective centers of the mandrel and of the turret, and to so position the flattener as to put precisely the required amount of pressure upon the trimmed tube end to properly flatten it.

My invention further contemplates the provision of a tube-trimming cutter which automatically recedes out of the way of the mandrel as the mandrel approaches the trimming position, and which puts the required amount of pressure upon the tube to trim it to length without permitting the cutter to engage the mandrel and thereby to dull the cutter.

My invention further contemplates the provision of an adjustable trimming cutter so mounted as to prolong its useful life without the necessity for sharpening the cutter except at long intervals.

The various objects of my invention will be clear from the description which follows and from the drawing, in which, Fig. 1 is a front elevation of a portion of a collapsible tube trimming machine showing my improved cutter and flattener applied thereto.

Fig. 2 is a top plan view of the same.

Fig. 3 is a side elevation of the same.

In the practical embodiment of my invention which I have illustrated by way of example, the turret 10, usually provided in collapsible tube trimming machines, is intermittently rotated to carry the mandrels 11 from station to station. Each of the mandrels may be provided with suitable mechanism for rotating the mandrels while the turret is at rest at any given station in a manner well known in the art and hence which need not be further described nor illustrated except to say that such mechanism is shown for example, in the patent to Walter Prussing for Automatic tube finishing and advancing machine, Re. No. 19,578, dated May 21st, 1935.

As the mandrel 11 is brought to the trimming station by the turret with the tube 12 thereon, said mandrel is rotated while the turret is at rest. By reason of the pressed engagement of the tube with the rotatable sharpened trimming disc or cutter 13, a cut as 14 is made at the proper point in the length of the tube to trim the tube to its proper length. During the trimming of the tube, owing to the sharpened bevelled edge of the cutter 13, the material of the tube is slightly indented as shown at 15, (Fig. 2). It therefore becomes advisable to flatten the thus indented part of the tube. This is done by the revoluble flattener 16 which engages and presses flat the material of the tube adjacent the cut 14 as the mandrel 12 is rotated about its own axis and is also moved from the trimming station to the next station and as is shown by the dash-dot lines of Fig. 1.

The cutter 13 is rotatably mounted as by means of its shaft 17 on the rod 18, said rod having a reduced portion 19 about which is arranged the spring 20. One end of said spring engages the shoulder 21 of the rod while the other end of the spring engages the shoulder 22 of the cutter block or slide 23 in which the rod 18 is slidably mounted. The lock nuts 24 on the threaded outer end of the rod 18 serves to adjust the stress on the spring and thereby to adjust the pressure of the cutter upon the tube during the trimming operation. The slide 23 is mounted on the bracket 25 for horizontal adjustment in the direction of the axis of the spring 20, as will be later described.

The bracket 25 is secured for vertical adjustment to the adjustable plate 9 as by means of the screw 27 and the bolt 26. The bolt 8 is also provided to secure the plate 9 to the machine frame. Each of the bolts 8 and 26 is provided with a head as 28 arranged in the enlarged rear part 29 of the horizontal T slot 30 made in the machine frame, the shank of the screw 27 and of the bolt 26 passing respectively through one of the vertically elongated slots 31 in the bracket and having a suitable nut mounted on the outer end thereof.

By loosening the bolts 8 and 26, the bracket 25 and the plate 9 may be horizontally adjusted in the direction of the axis of the mandrel to arrange the cutter in position to trim the tube to the desired length. By loosening the screw 27 and the bolt 26, the bracket is vertically adjustable to the extent permitted by the length of the slot 31. It thereby becomes possible to move the bracket 25 to so arrange the cutter 13 as to trim or cut off the tube 12 to an exact predetermined length thereof, and to regulate the distance of the circumference of the cutter from the surface of the trimming mandrel.

Means are also provided for adjusting the cutter 13 relatively to the mandrel 11 to trim tubes of different diameters. Such adjusting means comprises the slide 23 provided with the dovetail 33 at the bottom thereof, said dovetail entering a dovetail recess in the bracket and sliding therein. The bracket 25 is provided with the dovetail projection 34 which is bevelled on both of its side faces to engage one side of the dovetail 33. The other side of said dovetail 33 is engaged by the dovetail gib 35 secured to the bracket as by means of the bolt 36, whereby the slide 23 is removably and slidably secured to the bracket.

It will be noted that by loosening the bolts 36, slide 23 and the cutter carried thereby may be moved toward or from the mandrel to the exact position desired and secured in said position when the bolts 36 are tightened. For arranging the cutter close to the inner end of the mandrel, as when it is desired to trim tubes to the greatest lengths, the gib 35 is moved to the other side of the bracket 25 to form a dovetail recess parallel to and alongside the first-mentioned dovetail recess. The slide 23 and the parts carried thereby may then be arranged in the recess thus formed to bring the cutter closer to the end of the mandrel. In the recess 37 of the block 23 is adjustably pivoted the straightener arm 38 as by means of the bolt 39 passing through the slot 40 in the upright wall of the recess 37. At the other end of the arm is revolubly mounted the straightener 16 as by means of the bolt 49 passing through the bifurcated end 41 of the arm. Said straightener is preferably of larger diameter at its middle part and at its ends the surface thereof being arcuate in longitudinal section, as best seen in Fig. 2, so as to engage only the bent cut end portion 15 of the tube and to press said portion against the mandrel to flatten it as the mandrel moves out of the trimming station toward the next station. The adjusting screw 42, passing through the extension 43 of the slide 23, engages the straightener arm 38 and limits the lowermost position of the flattener 16. The pin 44, which projects upwardly from the arm, abuts against one end of the spring 45, which is mounted in the hollow projection 46, and the pressure of which is adjusted by means of the screw 47 screwed into said projection and held in its adjusted position by means of the lock nut 48.

In operation, the block 23 having been adjusted by means of the screws 36 and 27 to a position wherein the axes of the cutter 13, the mandrel 11 and the turret 10 are in alignment and the pressure of the springs 20 and 45 having been adjusted by means of the adjusting nuts 24 and the screw 47, respectively, and the bracket 25 having been adjusted by means of the bolts 8 and 26 to carry the cutter 13 to the proper position for trimming the tube to its proper length, the adjustment of said bracket also serving to align the centers of the cutter, mandrel and turret, then as the turret rotates to carry the tube 12 in a counter-clockwise direction as viewed in Fig. 1, to the trimming position shown in said figure, the tube as it reaches said position, engages the cutting edge of the cutter 13 with the required light pressure to initiate the cut 14. When the tube is in the trimming position, and as it moves out of said position, the mandrel 11 carrying said tube is rotated, thereby rotating the cutter 13 and completing the cut 14. As the turret is now rotated to carry the tube into the dash-dot line position thereof shown in Fig. 1, said tube engages the straightener 16 and tends to lift said straightener against the action of the spring 45. By the adjustment of the straightener arm relatively to the slot 40 and the adjustment of the screws 42 and 47, the pressure exerted by the tube upon the straightener may be regulated so that the straightener has precisely the required straightening force.

It being understood that the rotation of the mandrel continues as the tube passes the straightener, the bent end 15 of the tube is straightened as the turret rotates to carry the next tube into the trimming and straightening position.

It will be seen that by reason of my improved device, it becomes possible to align the centers of the cutter, mandrel and turret so that the locus of the path of movement of the outermost element of the mandrel is a cylinder tangent to the cutting edge of the cutter 13 whereby said cutting edge can cut accurately through the tube on the mandrel without unduly pressing against the mandrel and consequently without any material dulling effect upon the edge, so that the useful life of the cutting edge may be prolonged without the necessity of frequently sharpening.

Should, however, the adjustment be such that there is any tendency of the cutting edge of the cutter to meet the surface of the mandrel, then the pressure of the mandrel upon the cutter moves said cutter outwardly against the action of the spring 20, thereby avoiding the dulling effect of the mandrel upon the cutting edge.

Similarly, should the pressure of the tube upon the straightener 16 be too great, said straightener yields sufficiently to relieve such pressure, the arm 38 swinging in a clockwise direction about its pivot and slightly compressing the spring 45 to move out of the way of the advancing mandrel.

It will be seen that I have provided a simple and efficient mounting for the trimming cutter and for the straightener whereby excessive pressure thereon is automatically relieved and whereby the dulling effect of the mandrel upon the cutting edge of the cutter is minimized and the useful life of the cutter prolonged; and that I have provided a mounting whereby both the cutter and the straightener may be individually as well as simultaneously adjusted.

It will further be seen that I have provided a device well adapted to meet the severe requirements of practical use.

While I have shown and described certain specific embodiments of my invention, I do not wish to be understood as limiting myself thereto since I desire to claim my invention as broadly as may be permitted by the state of the prior art and the scope of the appended claims.

I claim:

1. In a collapsible tube trimming machine, an intermittently rotatable turret, a plurality of revoluble mandrels carried by the turret, a spring-pressed trimming disc, and means for supporting the trimming disc for adjustment in all directions comprising a slide carrying said disc and adjustable horizontally in one direction, a bracket supporting said slide and adjustable vertically, and means for supporting said bracket for adjustment in a horizontal direction at right angles to the direction of adjustment of said slide.

2. In a collapsible tube trimming machine, an intermittently rotatable turret, a plurality of revoluble mandrels carried by the turret, a revoluble cutting disc, and means for supporting said disc in position to trim the open end of a tube to cut a tube carried by the mandrel to a predetermined length while the turret is at rest and while said mandrel is being rotated, said means comprising a rod supporting said disc, a horizontal spring on the rod urging the disc toward the mandrel, a slide carrying said rod, means for adjusting said slide in the direction of the axis of said spring, a vertically adjustable bracket carrying said slide, and means for adjusting said bracket in a horizontal direction at right angles to the axis of said spring.

3. An adjustable cutter and flattener for trimming and flattening the ends of collapsible tubes, comprising a vertically adjustable frame, means for supporting said frame for adjustment horizontally in one direction parallel to the axis of the tube to be trimmed, a slide carried by said frame and adjustable in a horizontal direction at right angles to said one direction, a recessed projection on the slide, a rod carried by the slide, a spring urging said rod in said one direction, a disc cutter revolubly mounted on the rod, a lever pivoted in said recess, a flattener carried by said lever, and means including a spring for yieldingly urging said lever toward a wall of the recess.

4. In a collapsible tube trimming machine, a revoluble trimming cutter, a spring for urging said cutter toward its trimming position, means for adjusting the center of the cutter in all directions, comprising a slide revolubly supporting the cutter and supporting the spring, and vertically and horizontally adjustable means for supporting the slide, said slide being adjustable in a horizontal direction at right angles to the horizontal direction of adjustment of said slide supporting means, a spring-pressed flattener pivotally supported by the slide, and means for adjusting the pivot of said flattener.

5. In a collapsible tube trimming machine, a mandrel intermittently movable from station to station, a trimming disc, means for adjustably supporting said disc for adjustment of the center of said disc in all directions, and a spring carried by said means and urging the disc towards the mandrel, said disc being moved by the mandrel in a direction away from the mandrel against the action of the spring when excess pressure above a predetermined amount is put upon the disc by said mandrel during the intermittent movement of the mandrel.

6. In a collapsible tube trimming machine, a slide having a recess therein, a straightener carrying arm pivoted in said recess, a spring urging said arm against a wall of the recess, a spring-pressed rod mounted for horizontal movement in said slide, a cutting disc revolubly supported by the rod, and means adjustable vertically and horizontally for supporting said slide for adjustment of the disc in a horizontal direction at right angles to the direction of the adjustment of said means.

7. In a collapsible tube trimming machine, a cutting disc, a straightener, means movable horizontally in one direction for yieldingly supporting the disc and for pivotally supporting the straightener, and mounting means adjustable vertically while maintaining the horizontal adjustment thereof, and also adjustable in a horizontal direction at right angles to the direction of adjustment of the supporting means for supporting said supporting means whereby said cutter and said straightener may be simultaneously adjusted.

8. In a collapsible tube trimming machine, a cutting disc, a spring urging said disc in one horizontal direction toward the trimming position thereof, a first means for supporting the disc for adjustment in said horizontal direction, also for adjustment in a horizontal direction at right angles to said one horizontal direction, and means for supporting said first means for adjustment vertically while the horizontal adjustment is maintained.

9. In a collapsible tube trimming machine, a turret, a mandrel carried by the turret, a revoluble spring-pressed cutter, and means for supporting said cutter for adjustment in two horizontal directions at right angles to each other and also for vertical adjustment to align the centers of the turret, mandrel and cutter in the operative position of the cutter.

10. In a collapsible tube trimming machine, a revoluble spring-pressed cutter, a revoluble spring-pressed straightener, and means for supporting said cutter and said straightener for adjustment in all directions including a slide block means for slidably supporting the cutter in the block, and a lever supporting said straightener and pivoted to the block.

GEORGE W. TEMPLE.